United States Patent [19]

Hitch

[11] 3,992,051

[45] Nov. 16, 1976

[54] PROTECTOR FOR AUTOMOBILE FUEL TANK FILLER NECK

[76] Inventor: Ronald James Hitch, 1616 Harrington Drive, Champaign, Ill. 61820

[22] Filed: Nov. 19, 1975

[21] Appl. No.: 633,463

[52] U.S. Cl. .............................. 296/1 C; 141/390; 280/770
[51] Int. Cl.² ........................................ B60R 27/00
[58] Field of Search ............ 296/1 C, 1 F; 280/770; 141/390, 391, 392, 86, 87, 88

[56] References Cited
UNITED STATES PATENTS

| | | | |
|---|---|---|---|
| 2,460,394 | 2/1949 | Peatross............................. | 280/770 |
| 2,467,001 | 4/1949 | Allen .................................... | 141/86 |
| 2,538,813 | 1/1951 | Wagner................................ | 141/390 |
| 2,659,523 | 11/1953 | Comber............................... | 141/390 |

FOREIGN PATENTS OR APPLICATIONS

| | | | |
|---|---|---|---|
| 297,631 | 9/1928 | United Kingdom................. | 280/770 |

Primary Examiner—Robert R. Song
Assistant Examiner—David M. Mitchell
Attorney, Agent, or Firm—Jenkins, Hanley & Coffey

[57] ABSTRACT

A body finish protector for an automobile having a filler neck cap recessed behind the body surface and covered by an access door. The protector comprises a flap of resiliently flexible rubber-like material, one end of which is permanently attached by sheet metal screws or other suitable fastening devices behind the access door. The flap has a first storage position within the recess when the door is closed and a second protective use position when the door is open for providing access to the filler neck cap. When the flap is in the use position, the free end of the flap is folded outwardly from the storage position into overlying relation with a portion of the body exterior surface adjacent the access door. The flap may be installed so that its tendency is to fold out or start folding out when the door is opened. In the use position, the flap protects the area covered by it from marring by the fuel tank filler nozzle and from staining by fuel drippage.

6 Claims, 5 Drawing Figures

PROTECTOR FOR AUTOMOBILE FUEL TANK FILLER NECK

This invention relates to a permanently mounted protective flap for use on an automobile having a fuel tank filler neck recessed in the automobile body exterior surface and covered by an access door.

There are several well known types of protective bibs or flaps designed for placing about the filler necks of automobile fuel tanks to prevent the spillage of fuel on the automobile body exterior surfaces during filling of fuel tanks. See, for example, U.S. Pat. No. 2,538,813 issued Jan. 23, 1951 to Wagner and entitled Fender Protector, and U.S. Pat. No. 2,659,523, issued Nov. 17, 1953 to Comber, and entitled Protective Bib for Vehicles. The protective devices of these aforementioned patents are designed to prevent the spillage of fuel on the exterior body surfaces of the automobile during fueling operation and the resultant deterioration of the automobile finish due to such spillage. The devices of the aforementioned patents were designed for attachment to the filler neck or about the filler neck of an automobile during the fueling operation, the devices being removed from the filler neck when the fueling operation was completed.

It is an object of the present invention to provide an inexpensive protective flap which may be readily attached behind the access doors found on many modern automobiles, the protective flap being small enough to be readily storable in the space provided between the access door and the filler neck cap of the automobile and yet large enough to provide a cushion in the area of the auto body exterior surface adjacent the filler neck to prevent marring of the automobile body exterior finish in said area by the pump nozzles with which filling station fuel pumps are conventionally supplied. The flap of the present invention is an improvement over the prior art devices because it is permanently attached, it prevents marring or physical damage often caused by nozzles as well as chemical damage caused by fuel drippage, it is heavier and somewhat resilient in its use position to provide cushioning, and it is compact and out of sight in its storage position. The flap of this invention is extremely handy to use or move to its use position. The flap is preferably a resiliently flexible rubber-like flap folded against its tendency to move toward its use position. Thus, when the access door opens, the flap will be easily gripped by the attendant and moved to its use position.

Other objects of the present invention will become evident to those skilled in the art from the following detailed description and the accompanying drawings of which:

Figure 1:
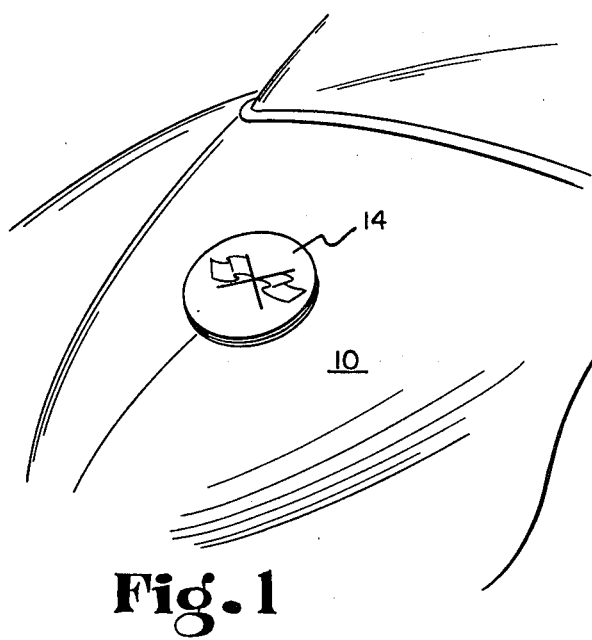
FIG. 1 illustrates an automobile body exterior surface and fuel tank filler cap access door, with the access door in the closed position.

Referring now to FIGS. 1–5, the fuel tank filler neck caps of many modern automobiles are hidden behind the automobile body exterior surface 10 by an access door 14. Access door 14 is connected to the body by a hinge 18, which hinge enables the door 14 to be swung outwardly from the body to provide access to the filler neck cap 19. The filler neck cap 19 may then be removed to expose the open end of the filler neck 20 so that the automobile may be fueled.

To provide enough space under the access door 14 for the filler neck cap 19 to protrude from the end of the fuel tank filler neck 20 and to allow the door 14 to close flush against the exterior surface 10, the fuel tank filler neck opening is conventionally recessed somewhat behind the exterior body surface 10 in a recess 21. The lip 22 of recess 21 is contoured and designed so that access door 14 may close into a flush-fitting relationship with body exterior surface 10 to define an enclosure in recess 21 behind the door 14.

In the present invention, a protective flap 26 is permanently attached at one of its ends 27 within the recess 21. Flap 26 is made of a cushioning resilient material, e.g., rubber. Flap 26 is mounted so that its free end 28 can be folded into recess 21. With flap 26 in the storage position, illustrated in FIG. 2, access door 14 may be closed to cover filler neck cap 19 and retain flap 26 in its storage position.

During the fueling operation, access door 14 is opened and free end 28 of flap 26 is unfolded from recess 21 outwardly over the lip 22 to cover a portion of exterior surface 10. Filler neck cap 19 is removed from filler neck 20 and a conventional filling station fuel pump nozzle 30 having a handle 34 is inserted into the filler neck. The fuel pump (not shown) to which nozzle 30 is attached by hose 38 is activated for the filling operation. Since the filling operation typically takes time, and the operator may want to leave the filler nozzle 30 unattended during a portion of the filling operation, the front surface of handle 34 of filler nozzle 30 may be rested against the protective flap 26. Flap 26 provides a cushion against which portions of nozzle 30 can rest without marring the finish on automobile body exterior surface 10. See FIG. 3.

Figure 2:
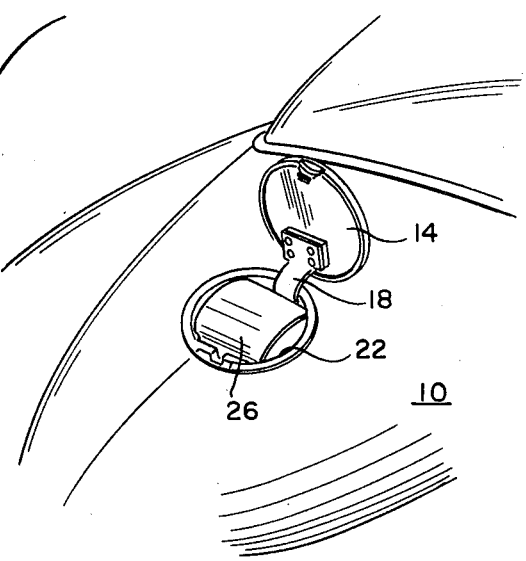
FIG. 2 illustrates that portion of the automobile body exterior surface of FIG. 1 with the access door in the open position and the protective flap of the instant invention in the storage position.
Figure 3:
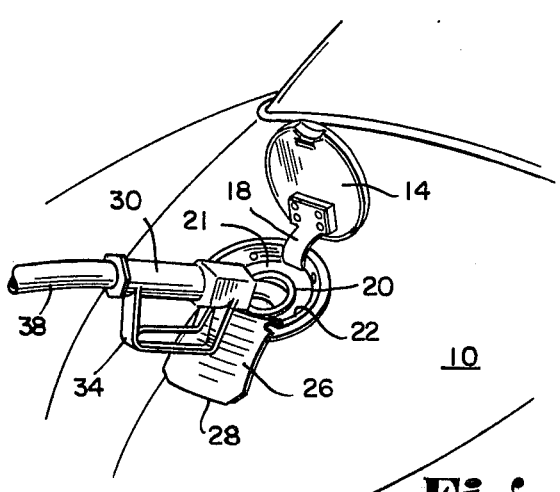
FIG. 3 illustrates that portion of the automobile body of FIGS. 1–2 with the access door in the open position, the protective flap in the use position, and a conventional filling station fuel pump nozzle inserted into the automobile fuel tank filler neck for filling of the automobile fuel tank.

When the filling operation is completed, nozzle 30 is removed from the filler neck 20, cap 19 is replaced thereon, flap 26 is folded into its storage position, illustrated in FIG. 2, and access door 14 is again closed.

Figure 4:
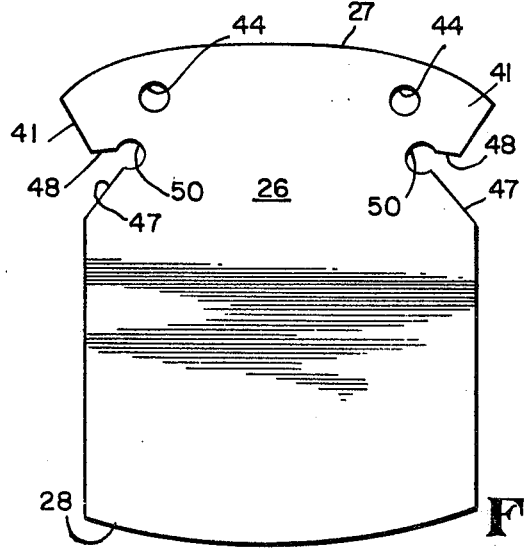
FIG. 4 illustrates a preferred embodiment of the protective flap of FIGS. 2–3.
Figure 5:
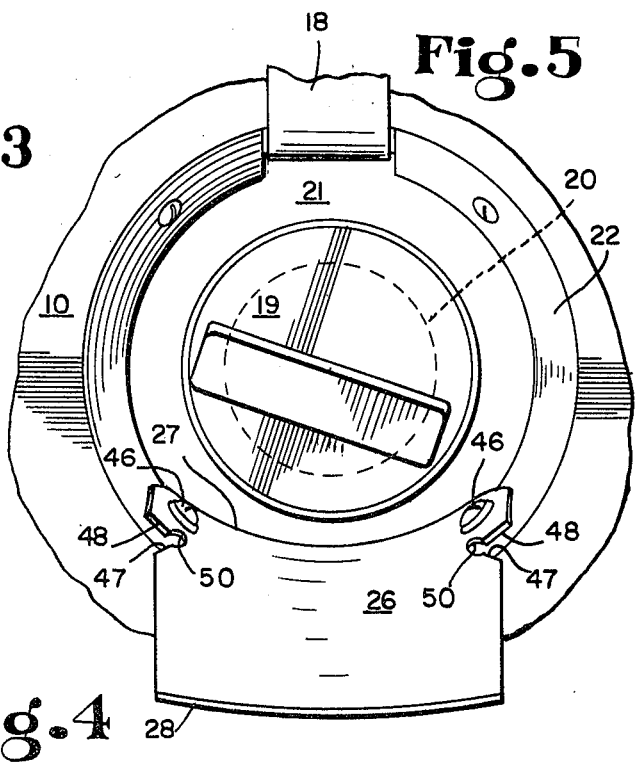
FIG. 5 is a larger scale, fragmentary perspective view, of the access door, the fuel tank filler neck cap, the recessed region of the automobile body around the filler neck cap, which region is not visible when the access door is closed, and the protective flap in the use position.

One preferred embodiment of the protective flap 26 and means for attaching it to the automobile body are illustrated in larger scale in FIGS. 4–5. In FIG. 4, flap 26 is a sheet of flexible material which sheet is generally rectangular in shape. At end 27 of sheet 26, which end is to be attached to the automobile body, is a pair of oppositely directed protrusions or tabs 41. Each of tabs 41 is provided with a generally centrally located hole 44. Attachment of protective flap 26 to lip 22 of the recess 21 is achieved using a pair of sheet metal screws or other suitable fastening devices 46. Holes are drilled at a proper interval around the perimeter of lip 22, said interval corresponding to the distance between holes 44 of flap 26. Fasteners 46 are then inserted through holes 44 and into the holes in lip 22, thereby affixing flap 26 permanently to the automobile body.

The illustrative flap for use on 1963 to 1967 Corvettes, is approximately 6 inches long and 4½ inches wide. The end 27 is rounded as illustrated conformingly to fit about lip 22 when installed. The end 28 is similarly rounded to fit within the circular recess 21 in the storage position. The tabs 41 are separated from the main body portion of flap 26 by notches defined by notch walls 47 and 48, the interior ends of which terminate in generally circular cutouts 50. These notches establish the point at which the flap 26 bends for movement between its use position and storage position. The cutouts 50, of course, resist further tearing inwardly from the notches.

It has been found that rubber flanges 26 approximately .05–.10 inch thick are ideal for the application of the present invention. Such flaps 26, which are relatively stiff, will extend slightly upwardly in the use position to provide a resilient cushion for the nozzle. One side of the flap 26 may have a corrugated surface with the corrugations running generally in the direction of the bending of the flap between cutouts 50.

Further, flap 26 is easy to move from its storage position to its use position. The attachment of the end 27 to the circular lip 22 causes the main body portion of flap 26 to curve about a longitudinal axis and thereby normally to tend to extend outwardly from recess 21. When the door 14 is raised, the flap 26 will tend automatically to move outwardly for easy access by the attendant.

Of course, flap 26 of the present invention is not limited in its use to generally circular or curved lips such as lip 22 of FIGS. 1–5. Flap 26 works equally satisfactorily with a variety of different lip shapes. The shape of flap 26 may vary considerably from that illustrated in FIGS. 2–5 to suit different lip shapes and applications.

This relatively small, resiliently flexible protective flap remains with the automobile at all times and can be readily unfolded into its use position whenever fuel is required. As illustrated in FIG. 1, protective flap 26 cannot be seen when it is in its storage position and access door 14 is closed.

I claim as my invention:

1. For use with an automobile having a fuel tank filler neck cap disposed within a recess behind the automobile body exterior, said filler neck cap being accessible through a door in the automobile exterior body surface, and said recess and said door defining an enclosure therebetween, a flexible flap for protecting the exterior surface finish during fuel filling operations, said flap being permanently attached interiorly of said enclosure and having a first storage position in which said flap is stored within said enclosure when said door is closed, and, when said door is open, a second use position covering the exterior surface adjacent said recess to prevent marring of the surface finish during fuel tank filling.

2. The invention of claim 1 in which said flap is a generally rectangular rubber sheet having a pair of attachment tabs on adjacent corners thereof connected to said recess.

3. In combination with an automobile fuel tank filler neck cap disposed within a recess behind the automobile body exterior, said cap being accessible through a door in the exterior surface, and said recess and said door defining an enclosure therebetween, a flexible flap for protecting the exterior finish during fuel filling operations, said flap being permanently attached interiorly of said enclosure and having a first storage position within said enclosure when said door is closed, and, when said door is open, a second use position covering the exterior surface of said automobile adjacent said recess to prevent marring of the automobile exterior finish during fuel tank filling.

4. The combination according to claim 3 wherein said flap is a resiliently flexible rubber-like sheet having a proximal end for mounting in said recess and a distal end, said proximal end being mounted in said recess so as to urge said distal end to move outwardly therefrom to dispose said sheet in said use position when said door is opened.

5. In an automobile having a fuel tank filler neck cap disposed within a recess behind the automobile body exterior, said recess having a mouth with a lip extending about said mouth, said filler neck cap being accessible through a door in the exterior surface, and said recess and said door defining an enclosure therebetween, the improvement comprising a flexible flap for protecting the exterior finish during fuel filling operations, said flap having a proximal end and a distal end, sid proximal end being attached to said lip to extend thereabout, said flap being foldable at a point adjacent said lip such that said distal end is movable into said recess to a storage position when said door is closed and outwardly to a protective use position when door is open.

6. The invention of claim 5 in which side flap is a resiliently flexible rubber-like flap, the distal end of which has a tendency to move outwardly from said recess, said flap being held by said door in said storage position against said tendency.

* * * * *

PO-1050
(5/69)

UNITED STATES PATENT OFFICE
CERTIFICATE OF CORRECTION

Patent No. 3,992,051     Dated November 16, 1976

Inventor(s) Ronald James Hitch

It is certified that error appears in the above-identified patent and that said Letters Patent are hereby corrected as shown below:

Column 4, line 42, "sid" should be -- said --;
line 46, after "when" and before "door" insert -- said --;
line 48, "side" should be -- said --.

Signed and Sealed this

Eighth Day of February 1977

[SEAL]

Attest:

RUTH C. MASON
Attesting Officer

C. MARSHALL DANN
Commissioner of Patents and Trademarks